US008296279B1

(12) United States Patent
Singh (10) Patent No.: US 8,296,279 B1
(45) Date of Patent: Oct. 23, 2012

(54) IDENTIFYING RESULTS THROUGH SUBSTRING SEARCHING

(75) Inventor: Mukesh Kumar Singh, Bihar (IN)

(73) Assignee: Google Inc., Mountain View, CA (US)

( * ) Notice: Subject to any disclaimer, the term of this patent is extended or adjusted under 35 U.S.C. 154(b) by 445 days.

(21) Appl. No.: 12/132,094

(22) Filed: Jun. 3, 2008

(51) Int. Cl.
*G06F 7/00* (2006.01)
*G06F 17/30* (2006.01)

(52) U.S. Cl. ........ 707/706; 707/711; 707/736; 707/741; 707/758

(58) Field of Classification Search .......................... None
See application file for complete search history.

(56) References Cited

U.S. PATENT DOCUMENTS

| | | | | |
|---|---|---|---|---|
| 5,799,299 | A * | 8/1998 | Fujiwara | 1/1 |
| 6,285,999 | B1 | 9/2001 | Page | |
| 6,556,990 | B1 * | 4/2003 | Lane | 707/774 |
| 7,444,326 | B1 * | 10/2008 | Jagadish et al. | 1/1 |
| 2006/0253431 | A1 * | 11/2006 | Bobick et al. | 707/3 |
| 2007/0106640 | A1 * | 5/2007 | Shankara | 707/3 |
| 2007/0162445 | A1 * | 7/2007 | Scriffignano et al. | 707/6 |
| 2008/0097988 | A1 * | 4/2008 | Broder et al. | 707/5 |
| 2008/0104502 | A1 * | 5/2008 | Olston | 715/229 |
| 2008/0294597 | A1 * | 11/2008 | Bourdoncle et al. | 707/2 |
| 2008/0313128 | A1 * | 12/2008 | Arasu et al. | 707/2 |
| 2009/0300770 | A1 * | 12/2009 | Rowney et al. | 726/26 |

OTHER PUBLICATIONS

W. B. Cavnar and J. M. Trenkle. N-gram-based text categorization, In Symposium on Document Analysis and Information Retrieval, pp. 161-176, University of Nevada-Las Vegas, 1994.*
Brin, S. and Page, L., "The anatomy of a large-scale hypertextual web search engine," Computer Networks and ISDN Systems, 30:107-117, 1998.

* cited by examiner

*Primary Examiner* — Jay Morrison
(74) *Attorney, Agent, or Firm* — Fish & Richardson P.C.

(57) ABSTRACT

Systems, methods, and computer program products identifying a search query, the search query including at least one search term. An index is used to identify a word as a search result for the search query, where the index includes a substring of the word, one or more inclusive strings corresponding to the substring, the one or more inclusive strings including the substring and at least one more character, and one or more word objects, the one or more word objects identifying content including the substring of the word.

28 Claims, 7 Drawing Sheets

FIG. 1

| String | Inclusive String(s) | Word Object(s) |
|---|---|---|
| xyz | null | 1, 3, 5, 7, 11 |
| xy | xyz | null |
| yz | xyz | null |
| xz | xyz | null |
| x | xy, xz | null |
| y | xy, yz | null |
| z | xz, yz | null |

| String | Inclusive String(s) | Word Object(s) |
|---|---|---|
| mukeshkumar | null | 1, 3, 5 |
| muke | mukeshkumar | null |
| ukes | mukeshkumar | null |
| kesh | mukeshkumar | null |
| eshk | mukeshkumar | null |
| shku | mukeshkumar | null |
| hkum | mukeshkumar | null |
| kuma | mukeshkumar | null |
| umar | mukeshkumar | null |
| muk | muke | null |
| uke | muke, ukes | null |
| kes | ukes, kesh | null |
| esh | kesh, eshk | null |
| shk | eshk, shku | null |
| hku | shku, hkum | null |
| kum | hkum, kuma | null |
| uma | kuma, umar | null |
| mar | umar | null |
| mu | muk | null |
| uk | muk, uke | null |
| ke | uke, kes | null |
| es | kes, esh | null |
| sh | esh, shk | null |
| hk | shk, hku | null |
| ku | hku, kum | null |
| um | kum, uma | null |
| ma | uma, mar | null |
| ar | mar | null |
| m | mu, um, ma | null |
| u | mu, uk, ku, um | null |
| k | uk, ke, ku | null |
| e | ke, es | null |
| s | es, sh | null |
| h | sh, hk | null |
| a | ma, ar | null |
| r | ar | null |

IDENTIFYING RESULTS THROUGH SUBSTRING SEARCHING

BACKGROUND

Locating results for certain search queries containing one or more search terms can be difficult in a conventional search engine. Some conventional search engines only retrieve results that exactly match a user-input search term so that pertinent results can be missed. Further, those search engines that do identify results that include partial matches of search terms conventionally do so by comparing a string of characters (e.g., a search word or a portion thereof) to all possible results within a database. This type of identification of all pertinent results is computationally intensive. The problem is compounded if a search engine permits the use of a wildcard character that broadens search terms to simultaneously represent numerous words or phrases.

SUMMARY

The present disclosure describes systems, methods, and computer program products that provide substring search results responsive to search queries.

In general, one aspect of the subject matter described in this specification can be implemented in methods, systems and computer program products. One method includes identifying a search query, the search query including at least one search term, and using an index to identify a word as a search result for the search query. The index includes a substring of the word, one or more inclusive strings corresponding to the substring, the one or more inclusive strings comprising the substring and at least one more character, and one or more word objects, the one or more word objects identifying content including the substring of the word.

According to one feature, the word occurs in a web page identified by a uniform-resource locator (URL). According to another feature, the method includes identifying a numerical variable 'k', and generating the index using the numerical variable 'k', wherein the substring of the word does not include a greater number of characters than the numerical variable 'k'. The index can include at least one index table or at least on indexed tree.

According to yet another feature, identifying the search query can include receiving a search query comprising at least one search term having a wildcard character. The search term can divide the search term into two or more sub-patterns. A sub-pattern, from the two or more sub-patterns, that is identical to the substring of the word can be identified. The word can be compared to the sub-patterns to determine if the word satisfies the sub-patterns. The word can be identified as a search result for the search query if the word satisfies the sub-patterns.

According to another method, an index can be created, the index corresponding to a word occurring at a network location, the index including two or more substrings of the word, one or more substrings associated with at least one of the two or more substrings of the word, and one or more locations, the one or more locations identifying content including the at least one of the two or more substrings of the word. The method also includes identifying a search query, the search query including at least one search term, and using the index to identify the word as a search result for the search query.

According to one feature, creating an index corresponding to a word can include creating an index corresponding to a word occurring in an object identified by a memory address or a unique ID in a storage device. In another feature, creating an index corresponding to a word can include creating an index corresponding to a word occurring in a web page identified by a uniform-resource locator (URL). According to another feature, the method includes receiving a numerical variable 'k', where two or more substrings do not include a greater number of characters than the numerical variable 'k'. The index can include at least one index table or at least on indexed tree.

According to yet another feature, identifying the search query can include receiving a search query comprising at least one search term having a wildcard character. The search term can be divided into two or more sub-patterns. According to another feature, a sub-pattern, from the two or more sub-patterns, is identified that is identical to the substring, of the two or more substrings, having the least number of associated sub-strings.

One or more of the following advantages can be achieved by some of the implementations. Search results for queries including one or more search terms, including one or more wildcard characters, can be retrieved without comparing the search terms to all entries in an index or database. Instead, the search terms are compared to only a subset of indexed entries. Additionally, search results are returned that are inclusive of search terms so that exact matches are not the only search results identified.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure now will be described more fully hereinafter with reference to the accompanying drawings, in which some, but not all implementations are shown. Indeed, these implementations can be embodied in many different forms and should not be construed as limited to the implementations set forth herein; rather, these implementations are provided so that this disclosure will satisfy applicable legal requirements. Like numbers refer to like elements throughout.

The present disclosure describes systems, methods, and computer program products that identify search results to a query, where the query can include one or more wildcard characters. The search results include results that are inclusive of a query. For instance, a query for the term 'cycle' can return results (e.g., words or URLs for web pages containing words) including 'motorcycle', 'bicycle', 'tricycle', and the like. To identify such results index tables are generated for words and sub-strings of the word. The index tables optionally include word objects that can identify, for instance, the URL of one or more web pages including the sub-strings. Search results are identified by comparing terms within a query against the sub-strings in the index tables.

Figure 1:
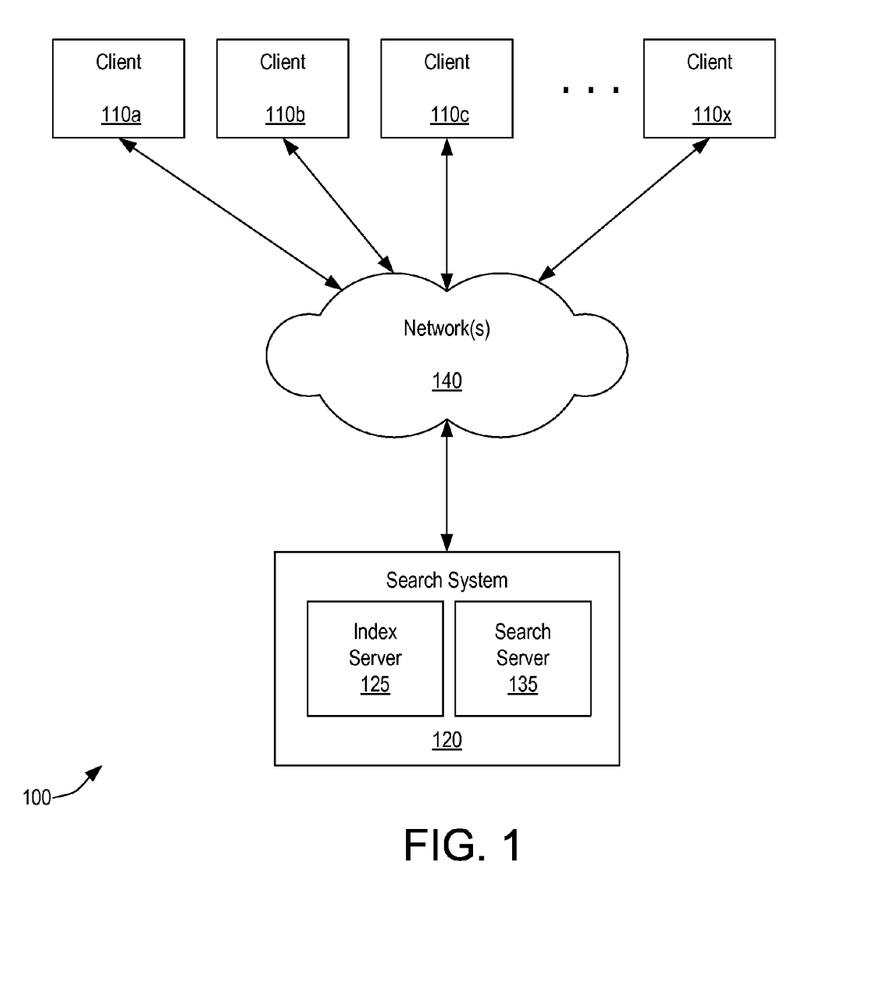
FIG. 1 is a block diagram of an example search system.

FIG. 1 is a block diagram of an example online environment 100. The online environment 100 can facilitate the identification and serving of content items, e.g., web pages, advertisements, etc., to users. One or more computer networks 140, such as a local area network (LAN), wide area network (WAN), the Internet, or a combination thereof, connect advertisers a search system 120 and client devices 110a, 110b, 110c, . . . , 110x. Example client devices 110 include personal computers, mobile communication devices, television set-top boxes, etc.

The search system 120 can include one or more servers that gather, process, maintain, manage information and/or provide search results to the client devices 110. In particular, the search system 120 includes a search server 135 that can receive search queries from client devices 110 and facilitate the return of relevant information to the client devices 110. Although described herein with respect to the example environment of a search query submitted via the Internet, the present disclosure also applies to a user submitting queries in non-Internet and/or non-web environments, such as SMS, e-mail, instant-message, and the like.

In some implementations, the search system 120 can include an index server 125 that processes and stores information associated with, for example, web pages, which may be collected during a crawl of a network, such as the Internet or a LAN. The index server stores word lists that identify words that occur in web pages, along with a word object. In some implementations the word can occur in an object identified by a memory address or a unique ID in a storage device.

The word object can include, for example, a location of a web page (e.g., URL) in which the word occurs. According to some implementations, the word object may be a null value, which may occur where a user seeks only words that occur but not the locations at which they occur. For instance, the system 120 could be used to search a dictionary, where only search results, and not the location of the search results, are provided to a client device. The word lists are used by the index server 125 to generate index tables of strings against which user-provided search terms can be compared by the search server 135. Although shown in FIG. 1 as part of the search system 120, the index server 125 can also be separate from and remote to the search system 120.

A client device, such as client device 110a, submits a search query to the search server 135, and search results can be provided to the client device 110a in response to the query. In some implementations the search query can be submitted to a search interface (not illustrated) by a client device 110, and the search system 120 uses the one or more search terms (including, e.g., one or more ASCII characters and/or words) in the search query to identify relevant search results. The search interface can be separate from the search server 135 and/or search system 120. The search results can include a link to web pages provided by the one or more web page publishers and/or by another client device 110. Other types of results are possible.

A search term can be, for example, a keyword or group of keywords submitted as part of a search query. For example, a user can search for a particular type of yellow flower with a long stem. The query submitted can be a search query for 'yellow gardenia.' The search terms for the search query are 'yellow' and 'gardenia.' In some implementations the wildcard characters '*' and '?' can be used as part of a search term, where the question mark '?' can be replaced by any character, and the asterisk '*' can be replaced by any number of characters, or no characters. For instance, the search term 'c?r' is inclusive of the search term 'car'. As another example, the query '*cycle' is inclusive of the search terms 'cycle', 'bicycle', and 'motorcycle'.

To facilitate identification of the search results responsive to queries, the search system 120 can index the content provided by content providers (e.g., web page providers or other publishers) for later search and retrieval of search results that are relevant to the queries. An exemplary search engine is described in S. Brin and L. Page, 'The Anatomy of a Large-Scale Hypertextual Search Engine,' Seventh International World Wide Web Conference, Brisbane, Australia (1998) and in U.S. Pat. No. 6,285,999. Search results can include, for example, lists of web page titles, snippets of text extracted from those web pages, and hypertext links to those web pages, and may be grouped into a predetermined number (e.g., ten) of search results.

Figure 2:
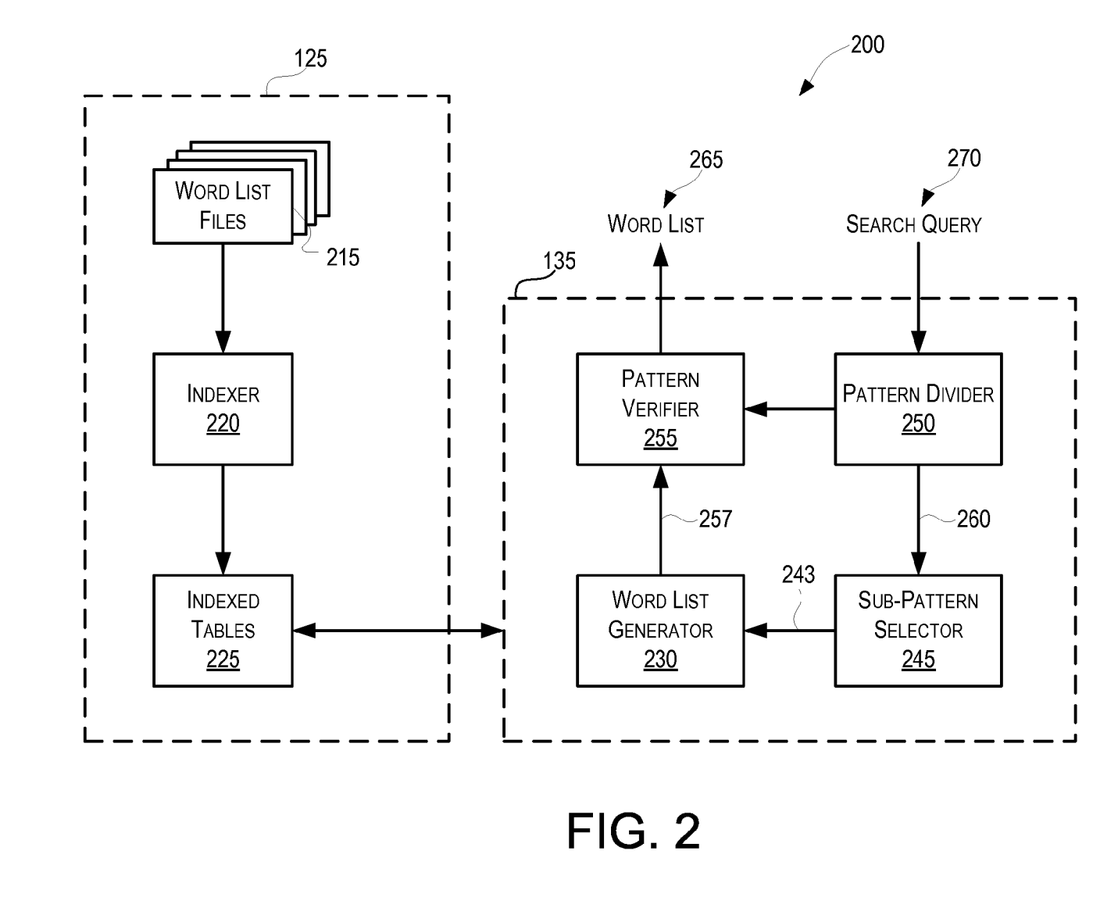
FIG. 2 is a block diagram of the example index system and search system.

FIG. 2 is a functional block diagram of the example index server 125 and search server 135 of FIG. 1. The logical blocks illustrated in FIG. 2 can be implemented in software, hardware, or a combination of hardware and software. In addition, each of the functional blocks can represent one or more computer processors, threads, and/or objects. It should also be understood that in alternative implementations, the functions performed by one of the blocks in FIG. 2 can be performed by another block, or by other components internal or external to the search system 120. In other implementations, a single logical block/processing device can perform the functions of the index server 125 and search server 135.

The index server 125 generally includes word list files 215, an indexer 220, and one or more indexed tables in memory 225. The word list files 215 identify words occurring within content at certain locations, for instance, web pages having URLs. According to some implementations the word list files 215 can be generated by a crawling of a network such as the Internet. According to other implementations the word list files can be generated by a search of a database of content, such as documents or emails.

The indexer 220 takes the list of words and generates an index table for each word. Each index table includes a word, a word object (e.g., a location of content in which the word was included, such as a URL), one or more substrings of the word, and word objects associated with each substring, which may identify, for instance, locations (e.g., URLs) of content where the substrings exist. The word and word objects can be extracted from the word list files 215. In some implementations, however, the word objects may be a null value. Additionally, for each word and substring the index table includes a list of inclusive strings that contain the word or substring.

Figure 3:
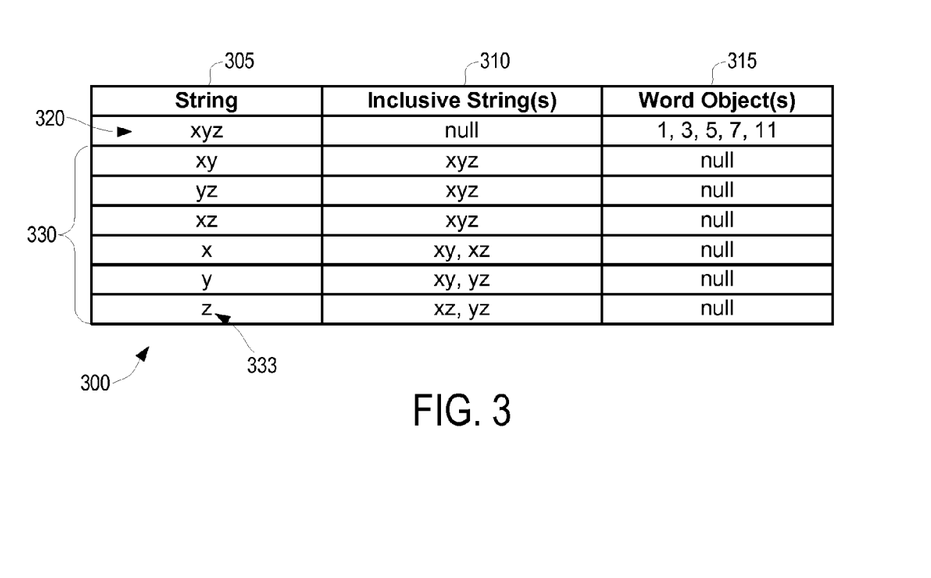
FIG. 3 shows an example index table.

FIG. 3 shows an example index table 300 for the word 'xyz'. The example index table 300 includes three fields: string 305, inclusive string(s) 310, and word object(s) 315. The first string 320 identifies the indexed word 'xyz', which represents a search term that is part of a search query. The word objects in this example identify the location of content that includes each string in the table 300. Here, 'xyz' represents a word identified within content at five locations, e.g., web pages, identified by URLs 1, 3, 5, 7, and 11. The URL information is provided, for instance, by a word list file to the indexer 220.

The remaining strings 330 within the index table 300 are substrings of the indexed word 'xyz', which means that each substring includes one or more, but not all of, the characters within the indexed word 'xyz'. According to some implementations, the remaining strings 330 can correspond to a word (e.g., the first string) in another index such that the other index is referenced for any substrings. The inclusive strings field 310 identifies the one or more parent strings that include each substring plus at least one more character, e.g., an ASCII character. For instance, the inclusive strings for substring 'z' 333 are 'xz' and 'yz', because 'xz' and 'yz' include the character 'z' along with one more ASCII character ('x' and 'y', respectively). The inclusive strings for substrings 'xz' and 'yz', in turn, are the indexed word 'xyz'.

The indexer 220 can routinely update index tables, for instance, once a day, or whenever word list files are updated or new word list files are generated. If a word is already present in an index table and an additional location is identified for that word the indexer 220 will update the index table for the word with the new location. The indexer 220 also ensures that duplicative word objects (e.g., locations such as URLs) are not identified within an index table for a particular word. On the other hand, if a new word is identified the indexer 220 will generate a new index table for the word.

Figure 4:
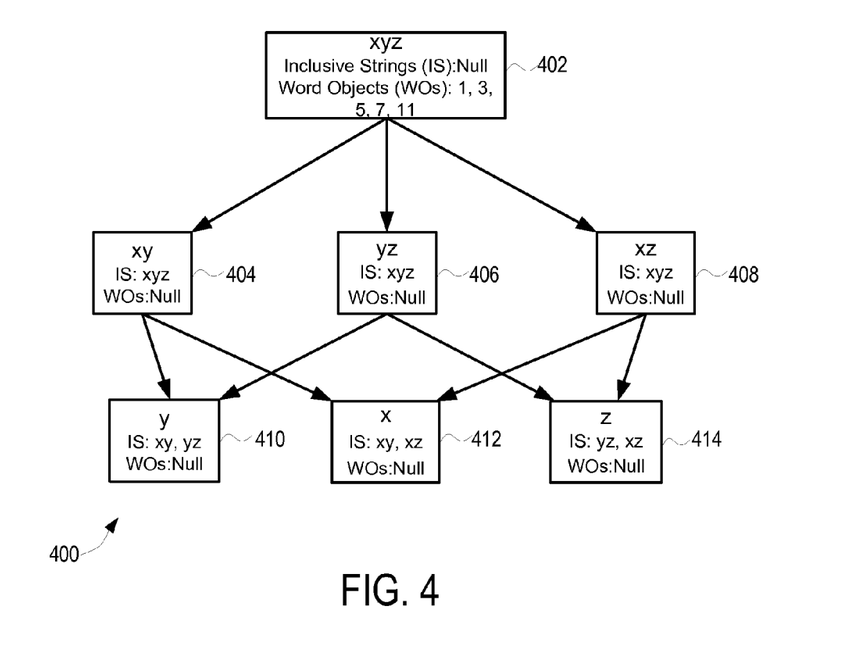
FIG. 4 shows a tree structure corresponding to the example index table of FIG. 3.

It will be appreciated that one or more index tables can be included within an indexed tree. For example, the index table 300 includes data that can be represented by the example tree structure 400 shown in FIG. 4. Each unique string and its corresponding word objects (here, URLs) represents a single node within the tree. The word that the index table 300 was generated for (here, 'xyz') represents the top node 402 in the tree. For this reason there is no inclusive string ('IS') for the word 'xyz'. As illustrated, each node also contains the word object, which in this example identifies the location at which the string occurs, as extracted from the word list files 215. For instance, the top node 402 for the word 'xyz' identifies URLs 1, 3, 5, 7, and 11, just as in the example index table 300 of FIG. 3. FIG. 4 shows nodes 404, 406, 408, 410, 412, 414 corresponding to the remaining strings (i.e., substrings of the string 'xyz') contained within the example index table 300.

Index tables (and/or an indexed tree containing the same content) permits the search system 135 to identify search results without comparing a search term to every entry in a database or tree. For instance, if a search is executed for the term 'y', the search results can use the table to identify the search results from corresponding inclusive strings containing the searched string, which are 'xy', 'yz', and 'xyz' in the example index table 300 of FIG. 3 and the tree 400 of FIG. 4. In this example, because 'xy' and 'yz' do not identify any URLs, the search result will identify only the URLs associated with the string 'xyz'. Other index table entries (or nodes, such as nodes 412, 414, and 408) that are associated with characters that are not included in the search term are not considered. This is in contrast to previous, exact match search systems that would require all entries to be considered as possible matches to a search term. As a result, the speed of identifying search results is increased.

Figure 5:
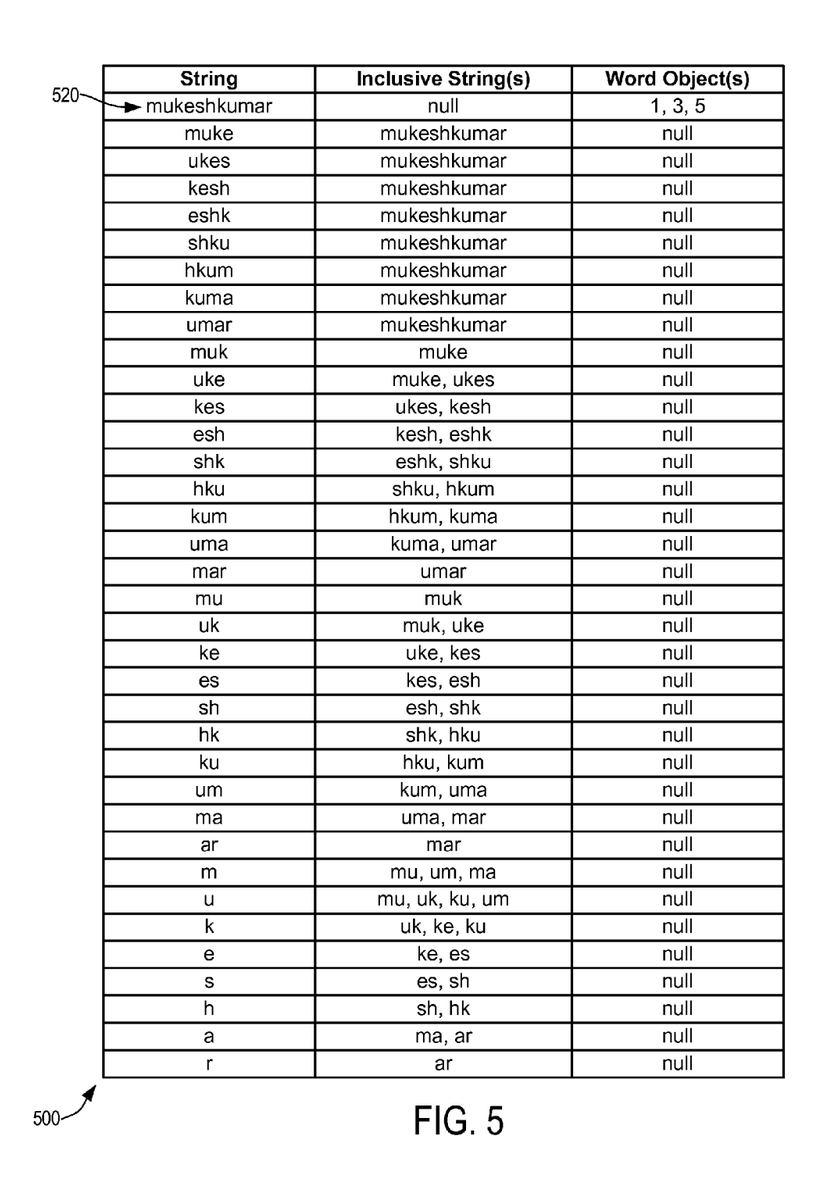
FIG. 5 shows another example index table.

FIG. 5 shows an example index table 500 for the word 'mukeskumar' 520. Because the number of substrings of a string may be significant, in some implementations the index system 125 can limit the number of substrings to all possible substrings of size 'K' or less, where 'K' is a variable that can be set by an administrator of the index system 125. This serves to decrease the size of the index tables for each word. The variable 'K' would be greater than or equal to 1, and less than or equal to the length of an indexed word (e.g., less than or equal to 10 in the example index table 500). In FIG. 5 the value of 'K' is set to 4. Therefore, only substrings of length 4 or less (i.e., substrings that have 4 or less ASCII characters) exist in the index table 500.

The size of the variable 'K' will impact the number of index table substrings, the number of inclusive strings identified for each substring, and the search time to identify search results. For instance, if the variable 'K' is large, e.g., 6 or greater, the number of index table entries and the number of inclusive strings for substrings will be large. If 'K' is large and a search is executed for a search term (e.g., word) having a string length (i.e., the number of characters in the search term) that is near 'K', the search time will be minimized.

Referring again to FIG. 2, the search server 135 uses the index tables to identify search results for a search query having one or more search terms. The search server 135 generally includes a word list generator 230, a pattern verifier 255, a pattern divider 250, and a sub-pattern selector 245.

A search query 270 input by a user is received from a client device 110 by the pattern divider 250. The search query 270 can include one or more search terms, such as words. In some implementations, the one or more search terms can each include one or more wildcard characters to allow a user to submit searches for words including various combination of characters and wildcard characters. In some implementations the wildcard characters '*' and '?' can be used, where the question mark '?' can be replaced by any character, and the asterisk '*' can be replaced by any number of characters, or no characters.

If the search term includes a wildcard character, the pattern divider 250 identifies sub-patterns from each search term of the search query 270, and transmits 260 each in a sub-pattern array to the sub-pattern selector 245. This permits the search server 135 to identify all possible search results for search terms including a wildcard expression. For instance, if a search term is 'ab?cd', the pattern divider 250 can identify sub-patterns that satisfy portions of the wildcard expression. According to some implementations, the pattern divider 250 can separate a search term into sub-patterns, where the wildcard characters '*' and '?' are used as separators. Thus, if the search term is 'ab?cd', the pattern divider 250 can generate a sub-pattern array that includes 'ab' and 'cd'. If a search term does not include a wildcard character, however, the pattern divider 250 does not divide the search term into sub-patterns.

The sub-pattern selector 245 receives the sub-pattern array 260 (i.e., list of sub-patterns) and identifies the sub-pattern matching the substring least number of inclusive strings within the indexed tables 225. For instance, if a search term is 'ab?cd', the sub-pattern selector 245 can identify the number of inclusive strings associated with the substring and sub-pattern 'ab', and the number of inclusive strings associated with the substring and sub-pattern 'cd'. The sub-pattern selector 245 will identify the sub-pattern having fewer number of inclusive strings associated with it. This may be done by a simply lookup of the number of inclusive strings in an index table for each substring that matched the sub-patterns.

As another example with reference to the index table 500 shown in FIG. 5, if a search term is 'k?mar', the sub-pattern selector 245 could use the index table 500 to identify that the sub-pattern and substring 'mar' has fewer inclusive strings than the sub-pattern 'k'. According to some implementations, the number of inclusive strings may be determined not only from the number of inclusive strings of the substring matching the sub-pattern, but a sum of the number of inclusive strings for the substring matching the sub-pattern and the number of inclusive strings corresponding to any string in an index identified by the inclusive strings. In this example, because both sub-patterns are both components of the search term, use of the sub-pattern 'mar' to identify matching strings reduces the number of inclusive strings that are considered as matches to the search term.

According to some implementations, to identify the sub-pattern having the least number of inclusive strings the sub-pattern selector 245 will count and store the number of inclusive strings associated with each node in an index table for each sub-pattern. According to other implementations the sub-pattern selector can attempt to guess the sub-pattern that has the least number of inclusive strings based on the size of a sub-pattern and/or based on the frequency of characters. For instance, if one sub-pattern includes several rarely-occurring characters, the sub-pattern selector can identify that sub-pattern as a better sub-pattern than another sub-pattern having only one or two characters that occur at a much higher frequency (i.e., exist in more locations, e.g., within web pages).

The word list generator 230 is operable to compare a sub-pattern 243 received from the sub-pattern selector 245 to index tables. The word list generator looks up the index tables (or indexed tree) for all the strings that are inclusive strings of the sub-pattern 243 received from the sub-pattern selector. For instance, referring to the example tree 400 of FIG. 4, if the sub-pattern 243 is 'xy', the word list generator 230 will identify the word 'xyz' because it is the inclusive string of the sub-pattern and substring 'xy'. The strings (including, e.g., words) identified by the word list generator 230 are provided 257 in a word list to the pattern verifier 255.

It will be appreciated that the value of 'K' can impact the comparison of sub-patterns to the index tables (or indexed tree) because the sub-pattern may, for instance, exceed the value of 'K'. If this occurs the word list generator will find the string of length K that provides the least number of inclusive strings and will identify its inclusive strings. Referring again to an example using the index table 500 shown in FIG. 5, if K=4 and the search term is "mukesh*", the pattern divider 250 will identify the sub-pattern as 'mukesh', but due to the limitations of K=4, the pattern divider 250 will divide the 'mukesh' sub-pattern in another set of sub-patterns with size of K. For instance, sub-patterns may be identified as 'muke', 'ukes', and 'kesh'. The sub-pattern selector 245 will use those sub-patterns to identify the best sub-pattern for use by the word list generator 230.

The pattern verifier 255 verifies that the strings and/or words identified by the word list generator 230 satisfy the sub-pattern provided by the pattern divider 250. If so, the words are added to a word list 265 with their corresponding location as possible search results for a search pattern 270. Each search term within a query is handled in this manner by the pattern divider 250, sub-pattern selector 245, word list generator 230, and pattern verifier 255, and the intersection or union of locations within the word list 265 satisfying a search query can be provided as search results. For instance, if a search query includes two terms 'ab?cd' and 'd?e', the intersection of the word lists for each of the individual terms 'ab?cd' and 'd?e' would identify the locations of content that includes words that satisfy both search terms.

Figure 6:
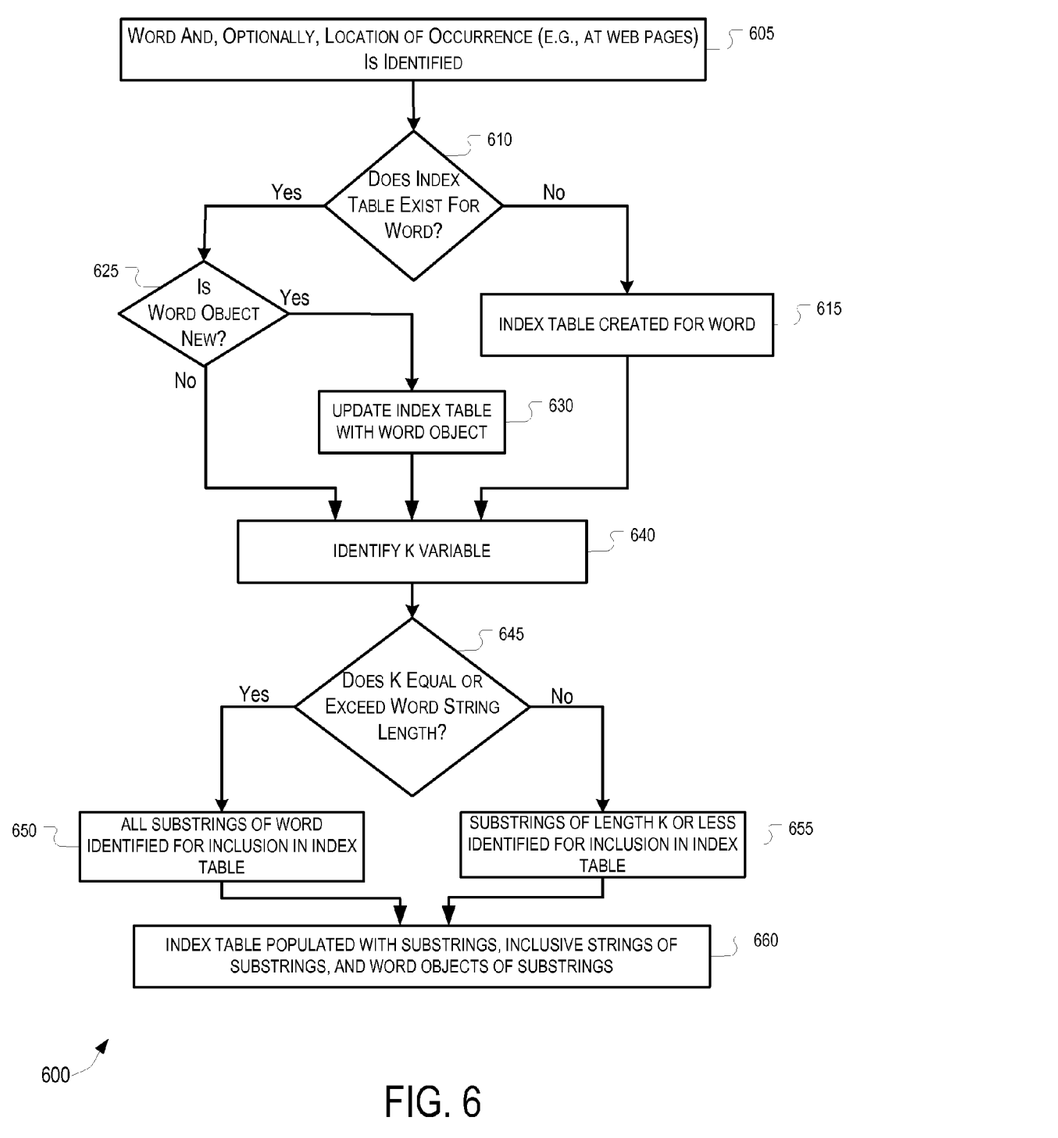
FIG. 6. shows an example index process.

FIG. 6 shows an example index process 600. A word occurring at one or more locations, e.g., within one or more web pages having URLs, is identified along with the one or more locations 605. In some implementations the indexer 220 receives the word and optionally, its corresponding locations from at least one word list file 215. If an index table fails to exist for the word, an index table is created for the word 610, 615. If an index table already exists for the word, it is determined if any new word objects (e.g., locations such as URLs) are identified by the at least one word list file 610, 620. According to some implementations, the determination can be performed by the indexer 220. If there are new word objects (e.g., locations) they are added to a corresponding entry in the index 630, for example, to the index table. According to some implementations, the creation and/or update of an index table with new word objects is performed by the indexer 220.

Next, a 'K' variable is identified to determine whether the index table will contain all substrings of the word, or only substrings of the word having 'K' or fewer characters 640. According to some implementations, the value of 'K' is set by an administrator. If the 'K' variable is set to a value that equals or exceeds the string length of the word, the index table for the word is populated with all substrings of the word 645, 650. If the 'K' variable is set to a value that is less than the string length of the word, the index table for the word is populated with substrings of the word having characters of length 'K' or less 645, 655. The index table is then populated with the strings (the word and its substrings, if any), along with the inclusive strings, and the location (e.g., URLs) at which the words occur 665. According to some implementations, the indexer 200 generates the index table and populates the information in the index table.

Figure 7:
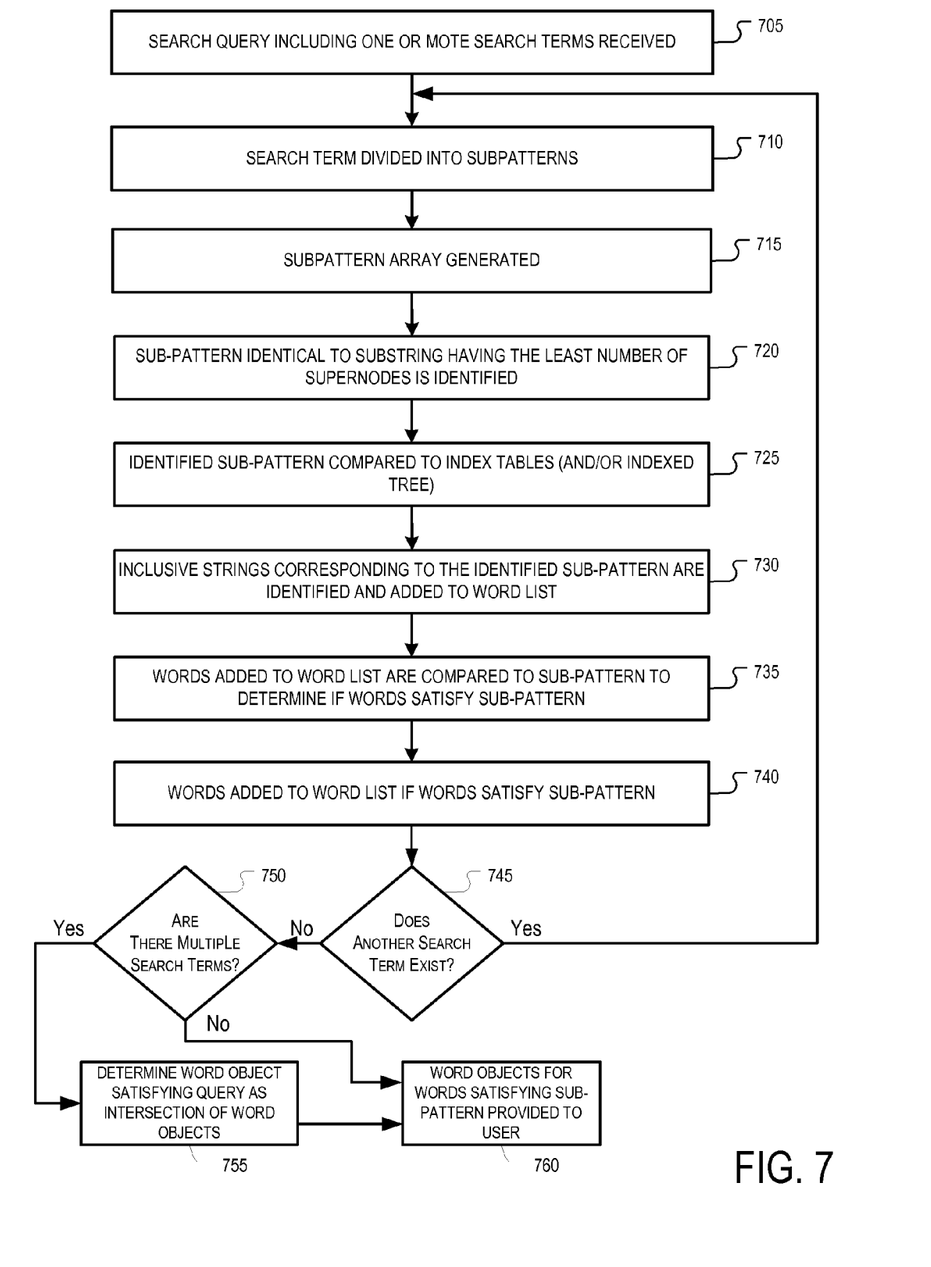
FIG. 7 shows an example process for identifying search results

FIG. 7 shows an example process for identifying search results 700. A search query having one or more search terms is identified 705. According to some implementations, the one or more search terms are received by the search server 135 from a client 110. Each search term can optionally include one or more wildcard characters to allow a user to submit searches for partial words. In some implementations the wildcard characters '*' and '?' can be used, where the question mark '?' can be replaced by any character, and the asterisk '*' can be replaced by any number of characters, or no characters.

Next, the search term is divided into sub-patterns 710 and a sub-pattern array is generated 715. According to some implementations, the pattern divider 250 divides the search term into sub-patterns and each of the sub-patterns are transmitted in a sub-pattern array to the sub-pattern selector 245. Next, the sub-pattern within the sub-pattern array that corresponds to the least number of inclusive strings within the indexed tables 225 (or indexed tree) is identified 720. According to some implementations, the sub-pattern selector 245 receives the sub-pattern array 260 (i.e., list of sub-patterns) and identifies the sub-pattern identical to the substring that has the least number of inclusive strings within the indexed tables 225.

The identified sub-pattern is compared to the index tables (and/or to an indexed tree containing the same information as the index tables) 725. According to some implementations, the word list generator 230 is operable to compare a sub-pattern 243 received from the sub-pattern selector 245 to strings in the index tables. Inclusive strings corresponding to the identified sub-pattern are identified and added to a word list 730. The word list can also include, in some implementations, a word object, such as a word object identifying the location at which each inclusive string occurs. For instance, the word list can include one or more URLs that identify the location of content in which words occur. The strings (which may include, e.g., an indexed word) are identified by the word list generator and are compared to the sub-pattern identified in block 720 to determine if the strings satisfy the sub-pattern 735. If so, the strings are added to a word list (e.g., word list 265) with their corresponding location as possible search results 740.

Each search term within a search query is handled in this manner by the pattern divider 250, sub-pattern selector 245, word list generator 230, and pattern verifier 255. Thus, the process repeats itself until no additional search terms exist within the search query 745. If there is only one search term, the word object (which may include, e.g., the location of content) for words satisfying the identified sub-pattern are identified, and can be provided and/or displayed to the client 110 as search results 750, 760. If there is more than one search term the one or more word objects for words satisfying the identified sub-patterns for each search term is determined, for example, as the intersection of the word objects corresponding to the words satisfying the identified sub-patterns for each search term 750, 755. For instance, if a search query includes two terms 'ab?cd' and 'd?e', where the term 'ab?cd' results in the identification of a word at URLs 1, 2, and 3, and the term 'd?e' results in the identification of a word at URLs 1, 3, and 5, the intersection of the word objects for the terms 'ab?cd' and 'd?e' will be URLs 1 and 3 because the content at those locations satisfy both search terms. According to some implementations, the union of results for two or more search terms may be identified as search results.

Figure 8:
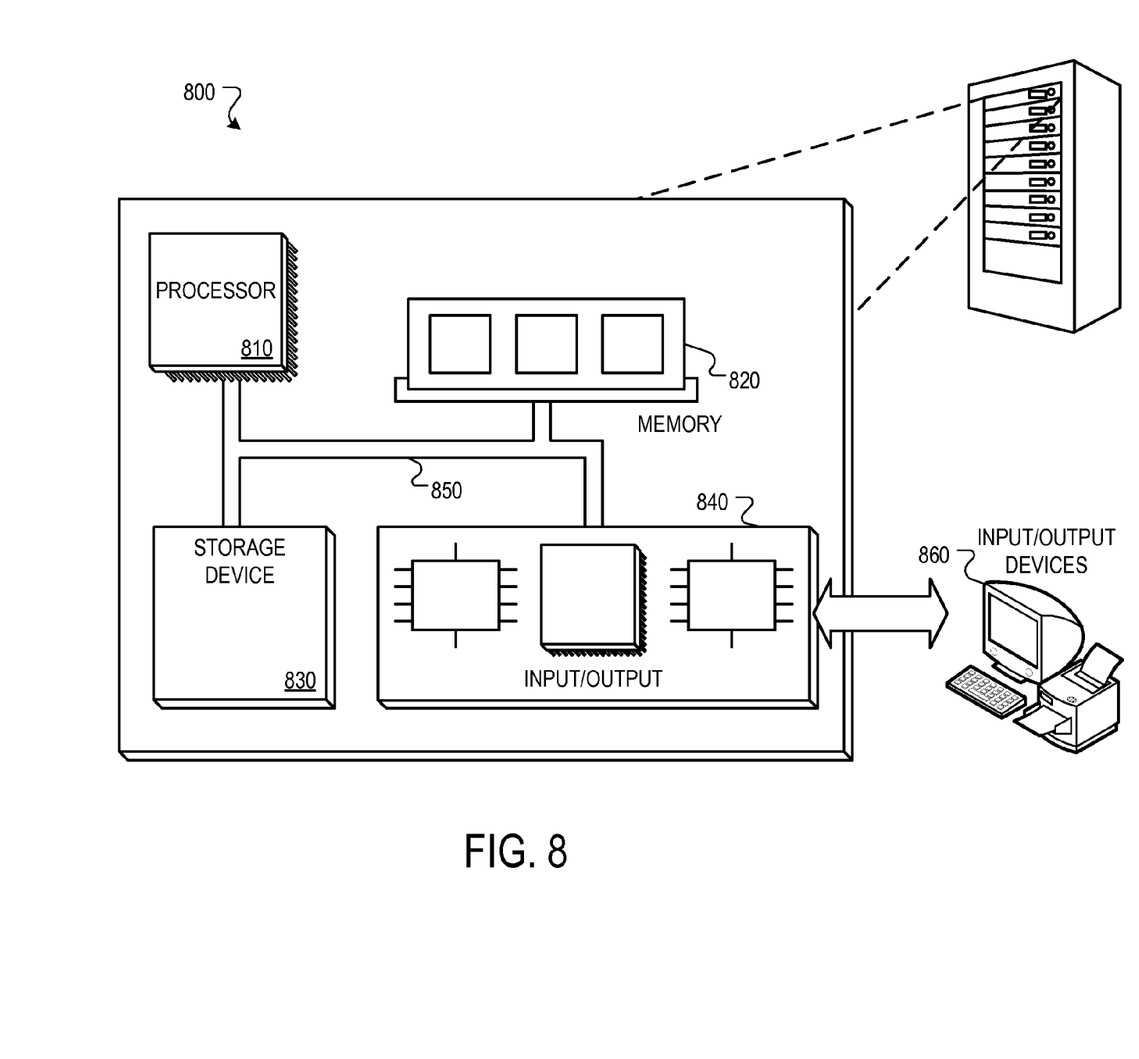
FIG. 8 shows an example of a generic computing device and a generic mobile device.

FIG. 8 is a block diagram of an example computer system 800 that can be utilized to implement the systems and methods described herein. The system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can, for example, include a hard disk device, an optical disk device, or some other large capacity storage device.

The input/output device 840 provides input/output operations for the system 800. In one implementation, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

The invention claimed is:

1. A computer-implemented method, comprising:
   identifying a search query comprising one or more search terms;
   identifying an index for a word, wherein the word or a substring of the word matches one of the one or more search terms of the search query, and wherein the index comprises:
      one or more substrings of the word, wherein each substring includes one or more but not all characters included in the word;
      one or more inclusive strings corresponding to the one or more substrings, each of the one or more inclusive strings comprising the corresponding substring and at least one more character included in the word; and
      two or more word objects, wherein each of the one or more substrings correspond to at least one of the two or more word objects, and the two or more word objects identify content that includes at least one substring of the word; and
   using the index to identify one or more search results for the search query based on the two or more word objects;
   wherein the word object is a location of a web page in which the word occurs.

2. The method of claim 1, wherein the word occurs in a web page identified by a uniform-resource locator (URL) identified by a word object that corresponds to the word.

3. The method of claim 1, further comprising:
   receiving a numerical variable 'k'; and
   generating the index using the numerical variable 'k',
   wherein the one or more substrings of the word do not include a greater number of characters than the numerical variable 'k'.

4. The method of claim 1, wherein the index comprises at least one index table or at least one indexed tree.

5. The method of claim 1, wherein at least one search term includes a wildcard character.

6. The method of claim 5, further comprising dividing the search term into two or more sub-patterns.

7. The method of claim 6, further comprising identifying a sub-pattern, from the two or more sub-patterns, that is identical to one of the one or more substrings of the word.

8. The method of claim 7, further comprising comparing the word to the sub-pattern to determine if the word satisfies the sub-pattern.

9. The method of claim 8, further comprising identifying the at least one word object that corresponds to the word as a search result for the search query if the word satisfies the sub-pattern.

10. A method, comprising:
   creating an index corresponding to a word occurring in content at one or more network locations, the index including:
      two or more substrings of the word;
      one or more inclusive strings associated with at least one of the two or more substrings of the word, each of the one or more inclusive strings comprising the corresponding substring and at least one more character included in the word; and
      one or more locations, wherein each of the two or more substrings correspond to at least one of the one or more locations, and the one or more locations identify content that includes at least one of the substring of the word;

identifying a search query, the search query including at least one search term that matches the word; and using the index to identify one or more search results for the search query based on the one or more locations included in the index wherein the location is a network location of a web page in which the word occurs.

11. The method of claim 10, wherein creating an index corresponding to a word comprises creating an index corresponding to a word occurring in an object identified by a memory address or a unique ID in a storage device.

12. The method of claim 10, wherein creating an index corresponding to a word comprises creating an index corresponding to a word occurring in a web page identified by a uniform-resource locator (URL).

13. The method of claim 10, further comprising receiving a numerical variable 'k', and wherein each of the two or more substrings do not include a greater number of characters than the numerical variable 'k'.

14. The method of claim 10, wherein the index comprises at least one index table or at least one indexed tree.

15. The method of claim 10, wherein identifying a search query comprises identifying a search query comprising at least one search term having a wildcard character.

16. The method of claim 15, further comprising dividing the search term into two or more sub-patterns.

17. The method of claim 16, further comprising identifying a sub-pattern, from the two or more sub-patterns, that is identical to the substring, of the two or more substrings, having a least number of associated inclusive substrings.

18. A system, comprising:
means for creating an index corresponding to a word occurring in content at one or more network locations, the index including:
two or more substrings of the word;
one or more inclusive strings associated with at least one of the two or more substrings of the word, each of the one or more inclusive strings comprising the corresponding substring and at least one more character included in the word; and
one or more locations, wherein each of the two or more substrings correspond to at least one of the one or more locations, and the one or more locations identify content that includes at least one of the substring of the word;
means for identifying a search query, the search query including at least one search term that matches the word; and
means for using the index to identify one or more search results for the search query based on the one or more locations included in the index;
wherein the location is a network location of a web page in which the word occurs.

19. The system of claim 18, wherein means for creating an index corresponding to a word comprises means for creating an index corresponding to a word occurring in a web page identified by a uniform-resource locator (URL).

20. The system of claim 18, further comprising means for receiving a numerical variable 'k', and wherein each of the two or more substrings do not include a greater number of characters than the numerical variable 'k'.

21. The system of claim 18, wherein the index comprises at least one index table or at least one indexed tree.

22. The system of claim 18, wherein the means for identifying a search query comprises means for identifying a search query comprising at least one search term having a wildcard character.

23. The system of claim 22, further comprising means for dividing the search term into two or more sub-patterns.

24. The system of claim 23, further comprising means for identifying a sub-pattern, from the two or more sub-patterns, that is identical to the substring, of the two or more substrings, having the least number of associated inclusive substrings.

25. The method of claim 1, wherein:
the one search term matches the word; and
the one or more search results include all content identified by the two or more word objects.

26. The method of claim 1, wherein:
the one or more substrings comprises a plurality of substrings and the two or more word objects comprise a plurality of word objects;
the one search term matches a first substring of the plurality of substrings of the word; and
the one or more search results include content identified by one or more word objects of the plurality of word objects, and the one or more word objects correspond to the first substring and one or more substrings that match the one or more inclusive strings that correspond to the first substring.

27. The method of claim 1, wherein:
the index further includes the word; and
at least one or more of the two or more word objects identify content that includes the word.

28. A computer-implemented method, comprising:
receiving a search query that includes one or more search terms;
identifying an index for a word, wherein the word matches one of the one or more search terms of the search query, and wherein the index comprises:
the word which includes a plurality of characters;
a plurality of substrings of the word, wherein each substring includes one or more but not all of the characters included in the word;
a plurality of inclusive strings corresponding to a substring from the plurality of substrings, each inclusive string from the plurality of inclusive strings comprising the corresponding substring and at least one more character included in the word, and
a plurality of word objects, wherein each of the words and each of the substrings corresponds to at least one of the word objects that identifies content that includes the respective word or substring; and
using the index to identify one or more search results for the search query based on the content identified by the plurality of word objects;
wherein the word object is a location of a web page in which the word occurs.

* * * * *

UNITED STATES PATENT AND TRADEMARK OFFICE
CERTIFICATE OF CORRECTION

PATENT NO.        : 8,296,279 B1
APPLICATION NO.   : 12/132094
DATED             : October 23, 2012
INVENTOR(S)       : Mukesh Kumar Singh It is certified that error appears in the above-identified patent and that said Letters Patent is hereby corrected as shown below:

Column 11, Line 5 at Claim 10; replace:
"included in the index" with
-- included in the index; --

Signed and Sealed this
Nineteenth Day of February, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,296,279 B1 | Page 1 of 1 |
| APPLICATION NO. | : 12/132094 | |
| DATED | : October 23, 2012 | |
| INVENTOR(S) | : Singh | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this
Second Day of September, 2014

Michelle K. Lee
*Deputy Director of the United States Patent and Trademark Office*